US011384847B2

(12) United States Patent
Wallmeyer et al.

(10) Patent No.: US 11,384,847 B2
(45) Date of Patent: Jul. 12, 2022

(54) FRICTIONLESS ROTARY VALVE

(71) Applicant: Honeywell International Inc., Morris Plains, NJ (US)

(72) Inventors: August Wallmeyer, Recke (DE); Christian Lampe-Juergens, Spelle (DE)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 17/096,048

(22) Filed: Nov. 12, 2020

(65) Prior Publication Data

US 2022/0146000 A1    May 12, 2022

(51) Int. Cl.
F16K 5/20     (2006.01)
F16K 1/22     (2006.01)
F16K 31/53    (2006.01)
F16K 1/228    (2006.01)
F16K 1/226    (2006.01)

(52) U.S. Cl.
CPC ............ F16K 5/204 (2013.01); F16K 1/221 (2013.01); F16K 1/228 (2013.01); F16K 1/2266 (2013.01); F16K 31/535 (2013.01)

(58) Field of Classification Search
CPC ........... F16K 31/535; F16K 1/24; F16K 5/204
See application file for complete search history.

(56) References Cited

U.S. PATENT DOCUMENTS 1,381,511 A * 6/1921 Smith ............ F16K 1/24
                                        251/279
2,530,295 A * 11/1950 Fantz ............ F16K 1/24
                                        137/625.44
2,655,942 A * 10/1953 Dougherty ...... F16K 1/24
                                        251/163

(Continued)

FOREIGN PATENT DOCUMENTS

CN    106949256 A    7/2017
CN    107763240 A    3/2018
CN    210978595 U    7/2020

OTHER PUBLICATIONS

"Rising Stem Ba, LL Valves (RSBV)", Control Seal, Retrieved from: https://www.controlseal.nl/valves/1-rsbv.html Retrieved on: Jul. 28, 2020 (2 pages total).

Primary Examiner — Reinaldo Sanchez-Medina
Assistant Examiner — Nicole Gardner
(74) Attorney, Agent, or Firm — John Maldjian; Stevens & Lee PC

(57) ABSTRACT

A frictionless rotary valve comprising: a valve body to be connected within a gas meter, the valve body comprising: a seal, fixedly attached near an outlet of the valve body; and a valve disc, having a ball bearing attached to the valve body; and a gear mechanism comprising: a worm wheel engaged with a worm, wherein the worm wheel is attached to a second end of the valve disc; a drive gear connected to the worm, wherein a rotation of the drive gear in a clockwise direction rotates the worm wheel in an anti-clockwise and moves the valve disc in a closed position; a worm wheel (Continued)

stop, for restricting a movement of the worm wheel in the anti-clockwise direction and driving the worm wheel in a vertically upward direction; and a linear guide attached to the worm wheel.

19 Claims, 9 Drawing Sheets

(56) References Cited

U.S. PATENT DOCUMENTS

| | | | | |
|---|---|---|---|---|
| 2,673,061 | A | * | 3/1954 | Albertf ............... F16K 1/24 |
| | | | | 251/227 |
| 2,688,341 | A | * | 9/1954 | McBain ............... F16K 1/24 |
| | | | | 137/630.14 |
| 2,690,894 | A | * | 10/1954 | Blevans ............ F16K 5/0647 |
| | | | | 251/163 |
| 3,477,690 | A | * | 11/1969 | Murota ........... F16K 31/52441 |
| | | | | 251/163 |
| 3,627,259 | A | * | 12/1971 | Williams ............. F16K 1/24 |
| | | | | 251/153 |
| 4,073,472 | A | * | 2/1978 | Chasey ............... F16K 1/24 |
| | | | | 251/229 |
| 6,042,083 | A | * | 3/2000 | Lee ................. F16K 31/60 |
| | | | | 251/161 |
| 6,805,332 | B2 | | 10/2004 | Crawley |
| 9,903,483 | B2 | | 2/2018 | Liu |

* cited by examiner

FRICTIONLESS ROTARY VALVE

BACKGROUND

The present disclosure pertains to valves having an extended life and minimum pressure losses to be used in gas meters such as natural gas meters, liquified gas meters, and so forth.

Description of Related Art

Ball valves or swivel valves (collectively "ball valves") are commonly used to control the flow of supply gas, or liquid within meters such as gas meters, water meters, and so forth. However, ball valves cannot be opened or closed without a sizable amount of energy after long standstill time due to the friction between the sealing ball and the sealing ring. The ball valves require a lot of energy to overcome the friction to ensure its functionality during its lifetime, which may span up to 20 years or so. This energy is currently not present in smart gas meters as they are battery driven and should survive for about 20 years or even longer.

There is thus a need for an efficient long-lasting valve system and method having minimum pressure loss for battery energized gas meters.

SUMMARY

The disclosure reveals a frictionless rotary valve for gas meters, the valve comprising: a valve body, to be connected within a gas pipeline or within a gas meter, wherein the valve body comprising: an inlet connected to an outlet through a central chamber; and a seal, fixedly attached near the outlet, along an inner circumference of the valve body. Further, the valve comprises a valve disc, having a ball bearing at a first end, wherein the ball bearing is attached to the valve body such that the valve disc is freely rotatable within the valve body. Further, the valve comprises a gear mechanism, to control a movement of the valve disc, wherein the gear mechanism comprising: a worm wheel engaged with a worm, wherein the worm wheel is attached to a second end of the valve disc. Further, the gear mechanism comprises, a drive gear connected to the worm, wherein a rotation of the drive gear in a clockwise direction rotates the worm wheel in an anti-clockwise direction such that the valve disc attached to worm wheel moves in a closed position. Further, the gear mechanism comprises, a worm wheel stop, for restricting a movement of the worm wheel in the anti-clockwise direction by driving the worm wheel in a vertically upward direction and a linear guide attached to the worm wheel, wherein a distance spring encloses a stem of the linear guide such that a movement of the worm wheel in the vertically upward direction compresses. In an opening procedure, the valve disc is moved in the direction of the linear guide and rotated afterward. In a closing procedure, the valve disc is rotated and then moved in a linear direction toward the closed position.

The disclosure reveals a frictionless rotary valve for gas meters. The valve comprising: a valve body, to be connected within a gas pipeline or within a gas meter, wherein the valve body comprising: an inlet connected to an outlet through a central chamber; and a seal, fixedly attached near the outlet, along an inner circumference of the valve body. Further, the valve comprises, a valve disc, having a ball bearing at a first end, wherein the ball bearing is attached to the valve body such that the valve disc is freely rotatable within the valve body. Further, the valve comprises, a gear mechanism, to control a movement of the valve disc, wherein the gear mechanism comprising: a worm wheel engaged with a worm at an angle of 90°, wherein the worm wheel is attached to a second end of the valve disc. Further, the gear mechanism comprises, a drive gear connected to the worm, wherein a rotation of the drive gear in a clockwise direction rotates the worm wheel in an anti-clockwise direction such that the valve disc attached to worm wheel moves in a closed position. Further, the gear mechanism comprises, a worm wheel stop, for restricting a movement of the worm wheel in the anti-clockwise direction by driving the worm wheel in a vertically upward direction and a linear guide attached to the worm wheel, wherein a distance spring encloses a stem of the linear guide such that a movement of the worm wheel in the vertically upward direction compresses the distance spring. Further, the valve disc moves toward the open position in the linear guide and rotates afterward when the valve disc is opened. In addition, the valve disc rotates and moves linearly toward the closed position when the valve disc is closed.

The disclosure reveals a method for operating a frictionless rotary valve. The method comprising steps of: rotating a drive gear, attached to a worm, in a clockwise direction such that a worm wheel engaged with the worm rotates in an anti-clockwise direction, wherein the rotation of the worm wheel in the anti-clockwise direction moves a valve disc attached to the worm wheel in a closed position; wherein a worm wheel stop restricts the movement of the worm gear in the anti-clockwise direction, and drives the worm wheel in a vertically upward direction. The distance spring encloses a linear guide provided in a valve body. Moreover, the method also includes an opening procedure, wherein the valve disc is moved toward the open position in the linear guide and rotated afterward. The method also includes an closing procedure, wherein the valve disc is rotated and moved linearly to the closed position.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present approach may provide a frictionless rotary valve that may have a longer life due to the frictionless movement between a valve disc and a seal.

The present approach may provide a frictionless rotary valve having a non-contact opening and closing of the valve, which can be implemented by a mechanical mechanism.

The present approach may provide a frictionless rotary valve that may have a two-stage opening or closing mechanical working procedure.

This present mechanism has a feature in it that it may use the advantages of the conventional used ball valves without harvesting the disadvantage.

A technical benefit is to have a frictionless rotary valve that is compliant with RoHS (Restriction of Hazardous Substances) directives and can be manually operated by hand.

A technical benefit is to have a frictionless rotary valve that is compliant with RoHS (Restriction of Hazardous Substances) directives and can be automatically operated by a motor.

A business advantage is to have a frictionless rotary valve having a seal such that it reduces a pressure loss during its operation and requires minimum or no maintenance. This is especially interesting for markets with a valve having a seal that become sticky after a long standstill causing a damage to the valve.

Further, due to reduced pressure loss, the frictionless rotary valve of the present mechanism may be effectively integrated into gas meters of varying sizes.

The present mechanism for sealing a valve, for example, a valve of a gas meter, may incorporate a valve disc that may be moved into a closed position or an open position through a gear mechanism. A valve disc may be moved within a valve body without contacting a seal providing a frictionless movement that increase a life of the valve.

Figure 1A:
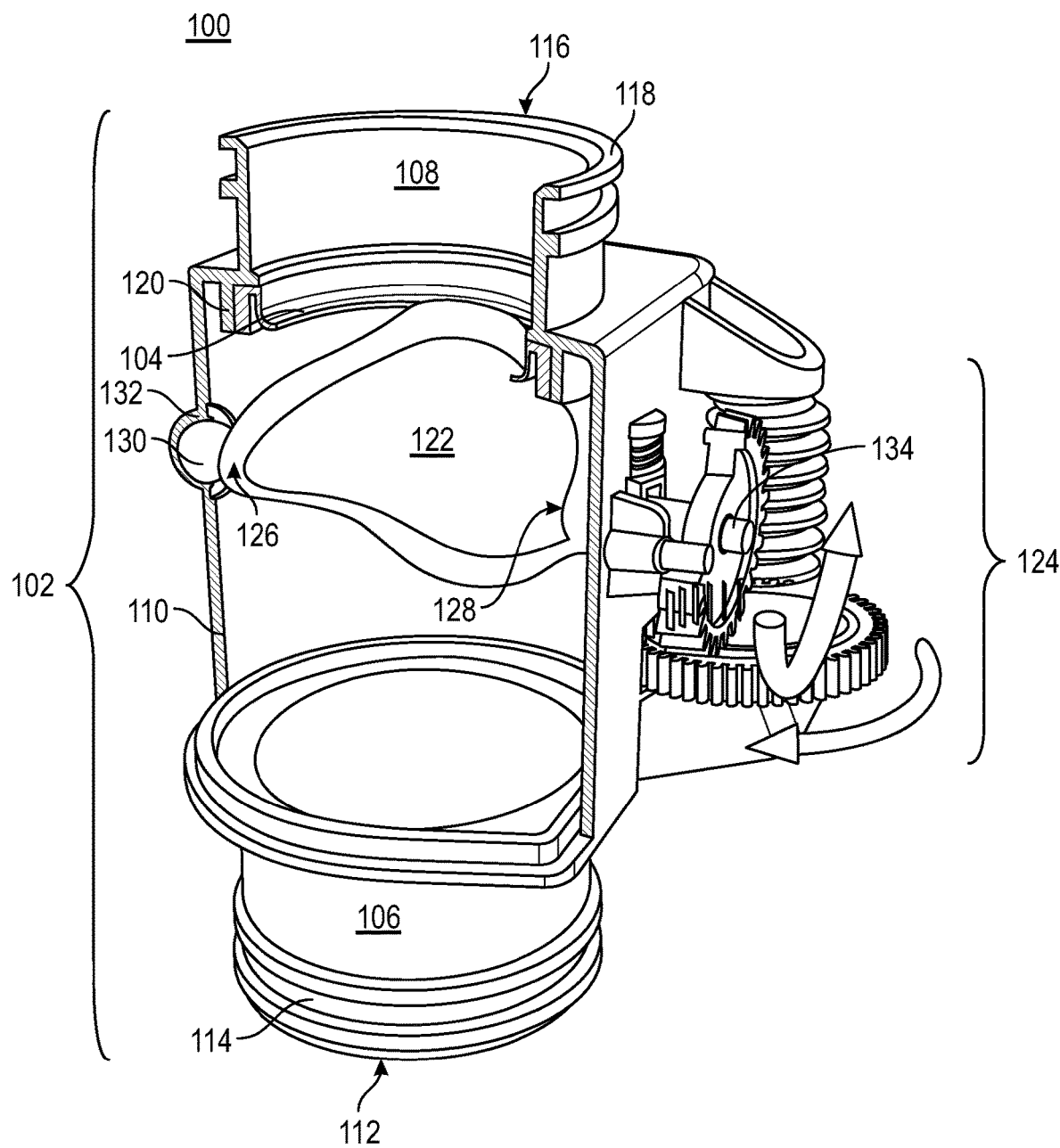
FIG. 1A is a diagram illustrating a cross-sectional view of a frictionless rotary valve.

FIG. 1A is a diagram illustrating a cross-sectional view of a frictionless rotary valve 100 comprising a valve body 102 having a seal 104. The frictionless rotary valve 100 may be used in a system where controlling a flow of a gas and or a liquid is required. Some of the examples of such systems may include, but not limited to, gas meters, water meters, and so forth. Further, the frictionless rotary valve 100 may have a non-contact opening and closing mechanism that requires less energy and is more friction free than the conventional ball valves. The valve body 102 may comprise an inlet 106 and an outlet 108 connected through a central chamber 110. The inlet 106 and the outlet 108 may be provided to connect the frictionless rotary valve 100 within a gas pipeline or within a gas meter (not shown). Further, a shape of the valve body 102 may be, for example, but not limited to, a cylindrical, a rectangular, and so forth. The valve body 102 may have any of the shape that may be beneficial in easily connecting the frictionless rotary valve 100 with the gas pipeline or within the gas meter.

In an embodiment of the present mechanism, the inlet 106 and the outlet 108 may have a diameter that may be smaller than a diameter of the central chamber 110 of the valve body 102. Further, the valve body 102 may be made up of a material such as, but not limited to, a synthetic plastic, a natural plastic, a natural rubber, a synthetic rubber, a metal, and so forth. The valve body 102 may be made up of any of the material known to a person skilled in the art that may be beneficial in providing a durability to the valve body 102. The inlet 106 may comprise a bottom end 112 having an O-Ring groove 114 provided on an outer surface of the inlet 106 that may be capable of enabling a user to mount the frictionless rotary valve 100 within a gas meter (not shown). The outlet 108 may comprise a top end 116 having an outlet O-Ring groove 118 provided on an outer surface of the outlet 108 that may be capable of enabling the user to mount the frictionless rotary valve 100 within a gas meter (not shown).

The seal 104 may be attached to a lip 120 extending vertically downwards from an inner surface of the outlet 108 along an inner circumference of the valve body 102. The seal 104 may be fixedly attached to the lip 120, in an embodiment of the present mechanism. In another embodiment of the present mechanism, the seal 104 may be removably attached to the lip 120. Further, the seal 104 may have an inverted V shape that may form a ledge along the inner circumference of the valve body 102. Further, the seal 104 may be made up of a material such as, but not limited to, a synthetic plastic, a natural plastic, a natural rubber, a synthetic rubber, and so forth. The seal 104 may be made up of any of the material known to a person skilled in the art that may be beneficial in providing a durability to the seal 104.

The frictionless rotary valve 100 may further comprise a valve disc 122 that may be a ball valve and/or a swivel valve capable of opening or closing the frictionless rotary valve 100 by rotating a gear mechanism 124. In an embodiment of the present mechanism, the gear mechanism 124 may be rotated automatically by a motor (not shown). In another embodiment of the present mechanism, the gear mechanism 124 may be rotated manually by a user. The valve disc 122 may be a hemi-spherical shaped ball that may comprise a first end 126 and a second end 128. The first end 126 of the valve disc 122 may comprise a ball bearing 130 that may be fixedly inserted into a hole 132 provided in a side wall of the central chamber 110. The second end 128 of the valve disc 122 may comprise a shaft 134 that may be attached to the gear mechanism 124, which will be explained in conjunction with FIG. 1B. Further, a diameter of the valve disc 122 may be slightly smaller than a diameter of the central chamber 110 forming a small separation between the valve disc 122 and the inner surface of the central chamber 110 for a frictionless movement of the valve disc 122 from an open position to a closed position, or from the closed position to the open position. The valve disc 122 may be made up of a material such as, but not limited to, a synthetic plastic, a natural plastic, a natural rubber, a synthetic rubber, a metal, and so forth. The valve disc 122 may be made up of any of the materials known to a person skilled in the art that may be beneficial in providing a durability to the valve disc 122.

Figure 1B:
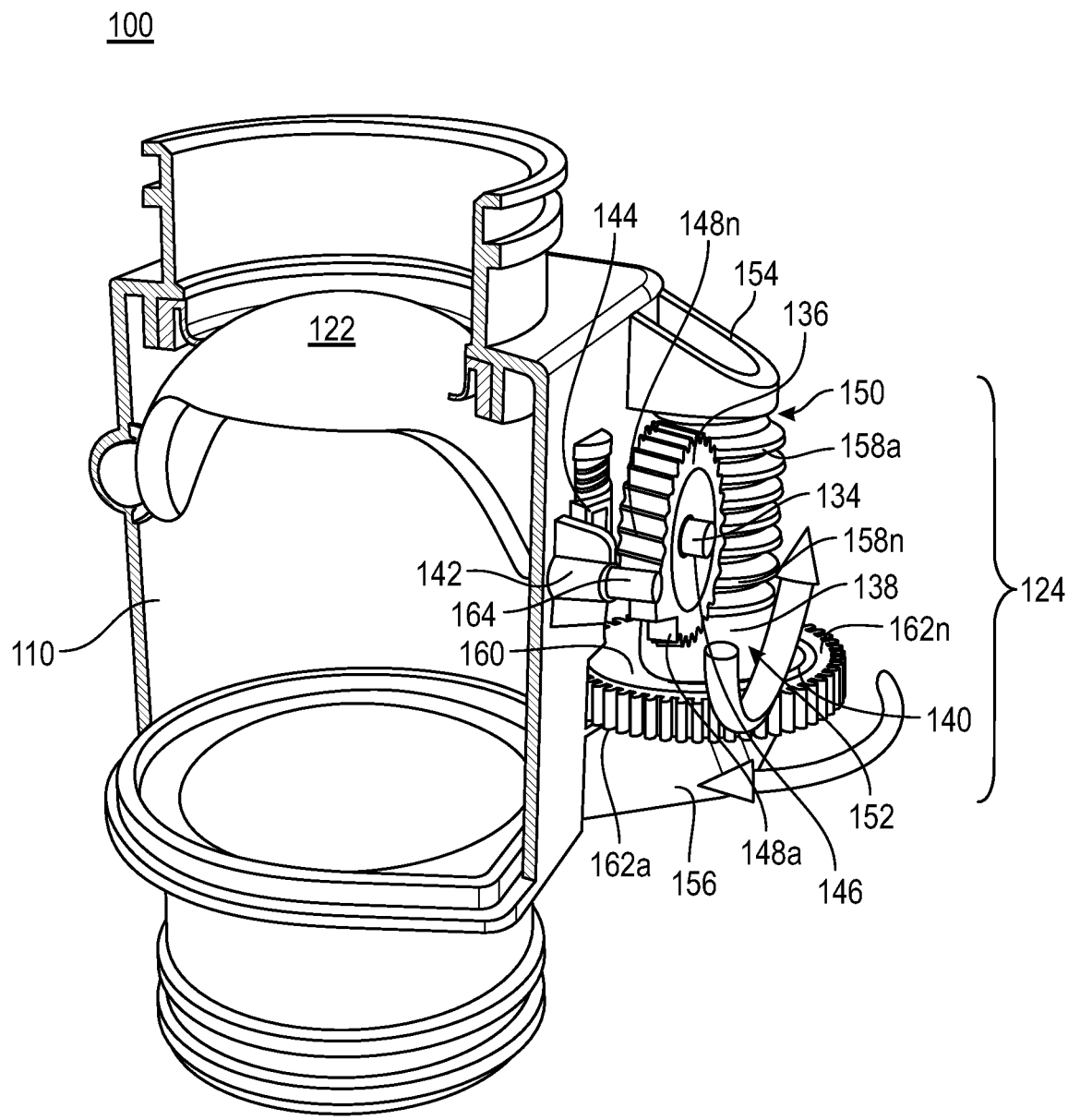
FIG. 1B is a diagram illustrating a cross-sectional view of the frictionless rotary valve having a valve disc in a closed position.

FIG. 1B is a diagram illustrating a cross-sectional view of the frictionless rotary valve 100 having the valve disc 122 in the closed position. The valve disc 122 may be provided to open or close the frictionless rotary valve 100 when the gear mechanism 124 is rotated. The gear mechanism 124 may comprise a worm wheel 136, a worm 138, a drive gear 140, a worm wheel stop 142, and a linear guide 144. The worm wheel 136 may be a circular shaped wheel attached to the shaft 134 of the valve disc 122. The shaft 134 may be fixedly inserted into a cavity 146 of the worm wheel 136, in an embodiment of the present mechanism. In another embodiment of the present mechanism, the shaft 134 may be removably inserted into the cavity 146 of the worm wheel 136. Further, the worm wheel 136 may have a S-shaped head along a circumference that may be capable of engaging with the worm wheel stop 142. Furthermore, the worm wheel 136 may comprise a plurality of teeth 148a-148n (hereinafter referred to as the teeth 148) along a circumference of the worm wheel 136. The worm wheel 136 may be made up of a material such as, but not limited to, a synthetic plastic, a natural plastic, a natural rubber, a synthetic rubber, a metal, and so forth. The worm wheel 136 may be made up of any of the material known to a person skilled in the art that may be beneficial in providing a durability to the worm wheel 136.

The worm 138 may be a cylindrical shaped vertical column that may comprise a top end 150 and a bottom end 152. The top end 150 of the worm 138 may comprise a top shaft (not shown) extending vertically upwards, in an embodiment of the present mechanism. The top shaft may be connected to a top support 154 protruding from the side wall of the central chamber 110. The top support 154 may comprise a top cavity (not shown) capable of accepting the top shaft of the worm 138 such that the top shaft is freely rotatable inside the top cavity. In another embodiment of the present mechanism, the top end 150 of the worm 138 may comprise a top cavity (not shown) that may be used to connect the worm 138 to the top support 154. The top support 154 may comprise a top shaft (not shown) extending vertically downwards that may be capable of engaging with the top cavity of the worm 138 such that the worm 138 is freely rotatable inside the top cavity.

Further, the bottom end 152 of the worm 138 may be fixedly attached to the drive gear 140, in an embodiment of the present mechanism. In another embodiment of the present mechanism, the bottom end 152 of the worm 138 may be removably attached to the drive gear 140. The bottom end 152 of the worm 138 may further comprise a bottom cavity (not shown) that may be capable of engaging with a bottom shaft (not shown) extending vertically upwards from a bottom support 156 that may be protruding from the side wall of the central chamber 110, in an embodiment of the present mechanism. In another embodiment of the present mechanism, the bottom end 152 of the worm 138 may comprise a bottom shaft (not shown) that may be capable of engaging with a bottom cavity (not shown) provided in the bottom support 156. The worm 138 may further comprise a plurality of screw teeth 158a-158n (hereinafter referred to as the screw teeth 158) on an outer surface along a circumference of the worm 138. Further, the screw teeth 158 may be capable of engaging with the teeth 148 of the worm wheel 136. The worm 138 may be made up of a material such as, but not limited to, a synthetic plastic, a natural plastic, a natural rubber, a synthetic rubber, a metal, and so forth. The worm 138 may be made up of any of the material known to a person skilled in the art that may be beneficial in providing a durability to the worm 138.

The drive gear 140 may be a circular shaped wheel attached to the worm 138. The worm 138 may be fixedly inserted into a drive gear cavity 160 of the drive gear 140, in an embodiment of the present mechanism. In another embodiment of the present mechanism, the worm 138 may be removably inserted into the drive gear cavity 160 of the drive gear 140. Further, the drive gear 140 comprises a plurality of gear teeth 162a-162n (hereinafter referred to as the gear teeth 162) along a circumference of the drive gear 140. In an embodiment of the present mechanism, the gear teeth 162 may be provided to impart a grip for a hand of the user to easily rotate the drive gear 140 in a clockwise direction, or in an anti-clockwise direction to operate the frictionless rotary valve 100 manually. In another embodiment of the present mechanism, the drive gear 140 may be connected to a motor (not shown) that may be configured to control the rotation of the drive gear 140. Further, the drive gear 140 may be made up of a material such as, but not limited to, a synthetic plastic, a natural plastic, a natural rubber, a synthetic rubber, a metal, and so forth. The drive gear 140 may be made up of any of the material known to a person skilled in the art that may be beneficial in providing a durability to the drive gear 140.

The worm wheel stop 142 may be a T-shaped structure that may be fixedly attached to the side wall of the central chamber 110, in an embodiment of the present mechanism. In another embodiment of the present mechanism, the worm wheel stop 142 may be removably attached to the side wall of the central chamber 110. Further, the worm wheel stop 142 comprises a stop shaft 164 that may be protruding in a horizontally outward direction from the worm wheel stop 142. The stop shaft 164 may be provided to act as a stopper for restricting a movement of the worm wheel 136 in the clockwise direction or in the anti-clockwise direction. Further the linear guide 144 may be provided to drive the valve disc 122 attached to the worm wheel 136 in a vertically upward direction, or in a vertically downward direction. The linear guide 144 will be explained below in conjunction with FIG. 1F.

According to an embodiment of the present mechanism, the valve disc 122 may be rotated from the open position (as shown in the FIG. 1A) to the closed position by rotating the drive gear 140 in the clockwise direction. The rotation of the drive gear 140 in the clockwise direction may rotate the worm 138 in a clockwise direction, thus rotating the worm wheel 136 engaged with the worm 138 in an anti-clockwise direction. Further, the rotation of the worm wheel 136 in the anti-clockwise direction may rotate the valve disc 122 in an anti-clockwise direction to an angle of 90° from the open position to the closed position.

Figure 1C:
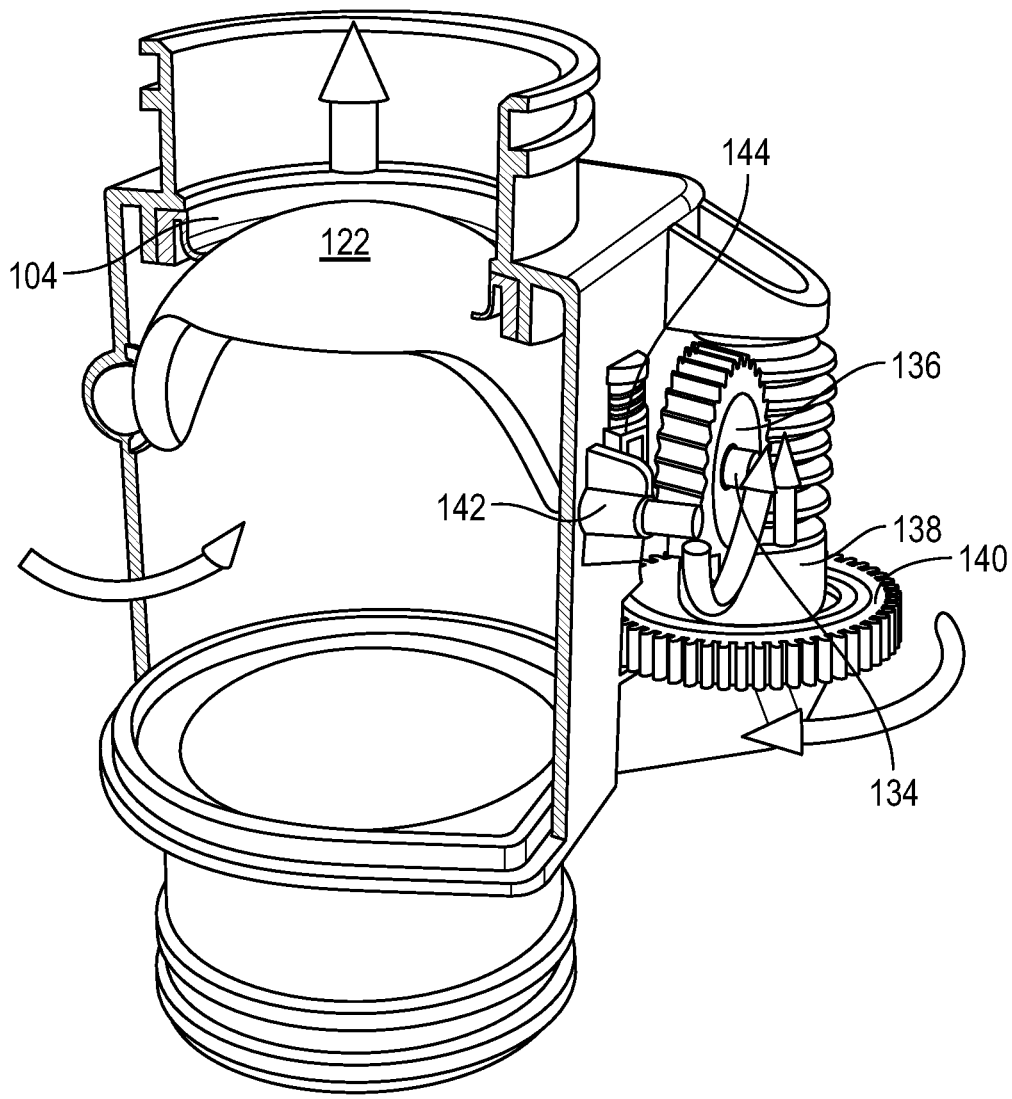
FIG. 1C is a diagram illustrating another cross-sectional view of the frictionless rotary valve having the valve disc in the closed position.

FIG. 1C is a diagram illustrating a cross-sectional view of the frictionless rotary valve 100 with the valve disc 122 in the closed position. According to an embodiment of the present mechanism, the valve disc 122 may be rotated from the open position (as shown in the FIG. 1A) to the closed position by rotating the drive gear 140 in the clockwise direction. The rotation of the drive gear 140 in the clockwise direction may rotate the worm 138 in the clockwise direction, thus rotating the worm wheel 136 engaged with the worm 138 in the anti-clockwise direction. Further, the rotation of the worm wheel 136 in the anti-clockwise direction may rotate the valve disc 122 in the anti-clockwise direction to the angle of 90° from the open position to the closed position. Furthermore, the worm wheel stop 142 may engage with the S-shaped head of the worm wheel 136 and restrict the movement of the worm wheel 136 in the anti-clockwise direction. The worm wheel stop 142 may act as the stopper that may restrict the movement of the worm wheel 136 and may then drive the worm wheel 136 linearly in the vertically upward direction through the linear guide 144. Further, the movement of the worm wheel 136 in the vertically upward direction may drive the valve disc 122 in a vertically upward direction thus pressing the valve disc 122 into the seal 104 and completely closing the frictionless rotary valve 100, which completely restricts a flow of the gas or liquified gas from the central chamber 110 to the inlet of the gas pipeline or the outlet of a gas meter (not shown).

Figure 1D:
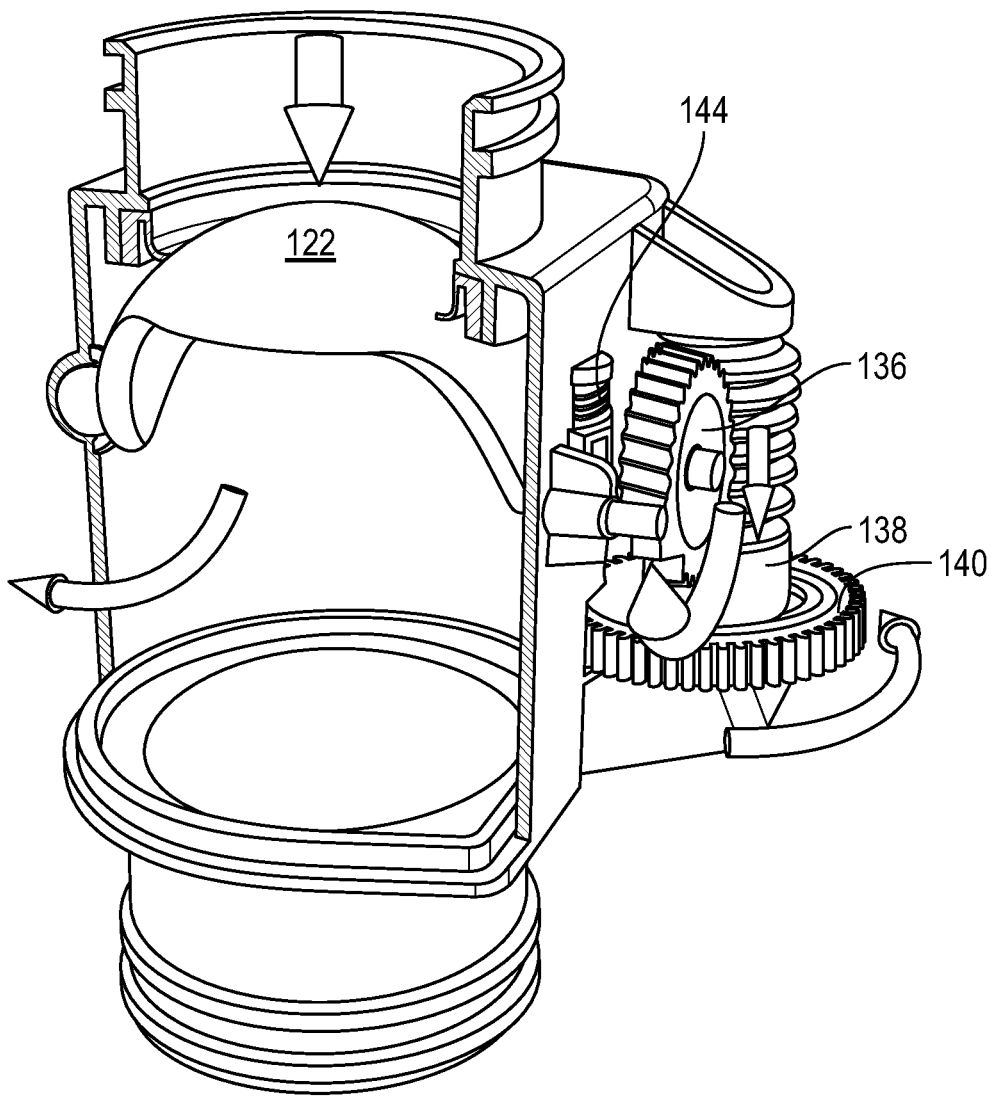
FIG. 1D is a diagram illustrating yet another cross-sectional view of the frictionless rotary valve having the valve disc in the closed position.

FIG. 1D is a diagram illustrating a cross-sectional view of the frictionless rotary valve 100 with the valve disc 122 in the closed position. According to an embodiment of the present mechanism, the frictionless rotary valve 100 may be opened by rotating the valve disc 122 from the closed position to the open position by rotating the drive gear 140 in the anti-clockwise direction. The rotation of the drive gear 140 in the anti-clockwise direction may further rotate the worm 138 in an anti-clockwise direction that may further rotate the worm wheel 136 engaged with the worm 138 in a clockwise direction. The rotation of the worm wheel 136 in the clockwise direction may expand the distance spring 176 (as shown in the FIG. 1F) and may first drive the valve disc 122 in a vertically downward direction through the linear guide 144. Further, the rotation of the worm wheel 136 in the clockwise direction may then rotate the valve disc 122 in a clockwise direction to an angle of 90° from the closed position to the open position.

Figure 1E:
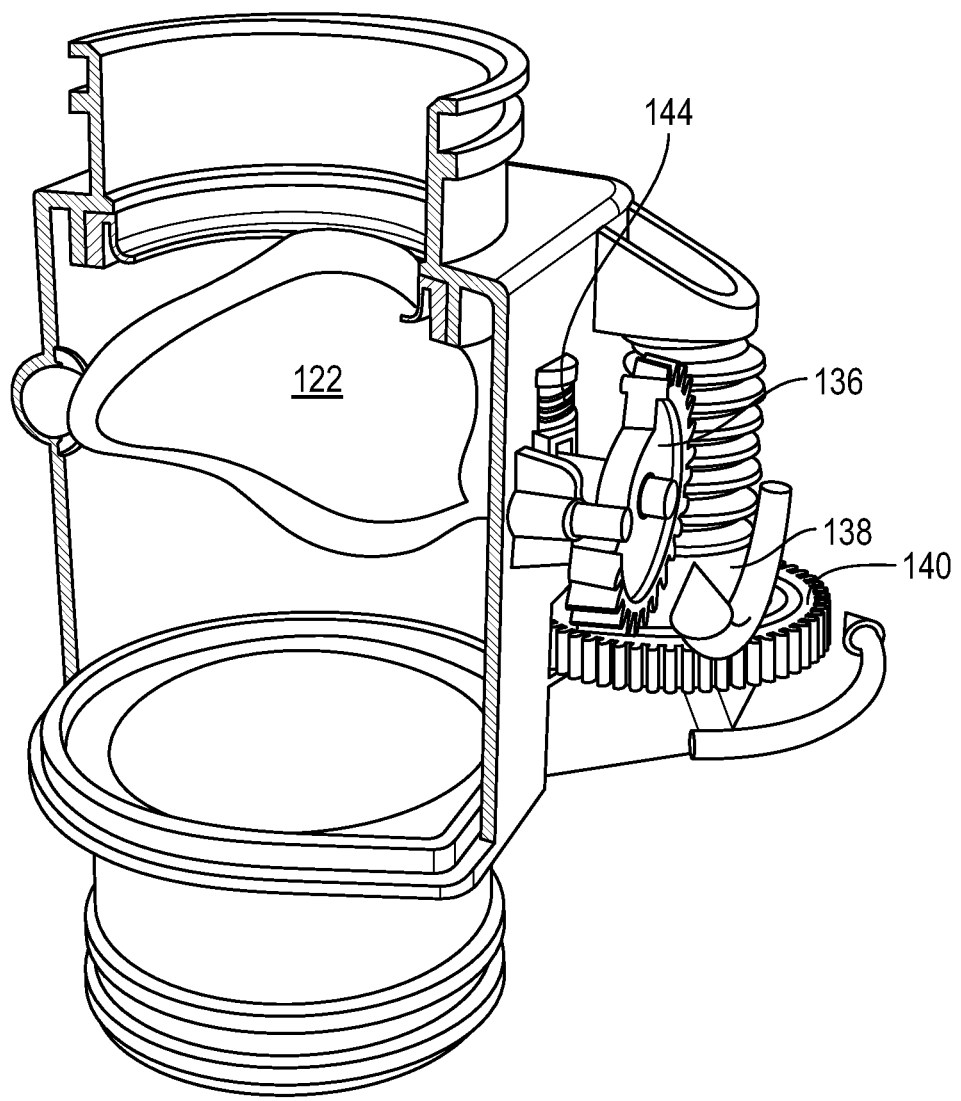
FIG. 1E is a diagram illustrating a cross-sectional view of the frictionless rotary valve with the valve disc in an open position.

FIG. 1E is a diagram illustrating a cross-sectional view of the frictionless rotary valve 100 with the valve disc 122 in the open position. The frictionless rotary valve 100 may be opened by when the valve disc 122 rotates from the closed position to the open position by rotating the drive gear 140 in the anti-clockwise direction. The rotation of the drive gear 140 in the anti-clockwise direction may rotate the worm 138 in the anti-clockwise direction that may further rotate the worm wheel 136 engaged with the worm 138 in a clockwise direction. The rotation of the worm wheel 136 in the clockwise direction may first drive the valve disc 122 in the vertically downward direction through the linear guide 144. Further, the rotation of the worm wheel 136 in the clockwise direction may then rotate the valve disc 122 in the clockwise direction to the angle of 90° from the closed position to the open position.

Figure 1F:
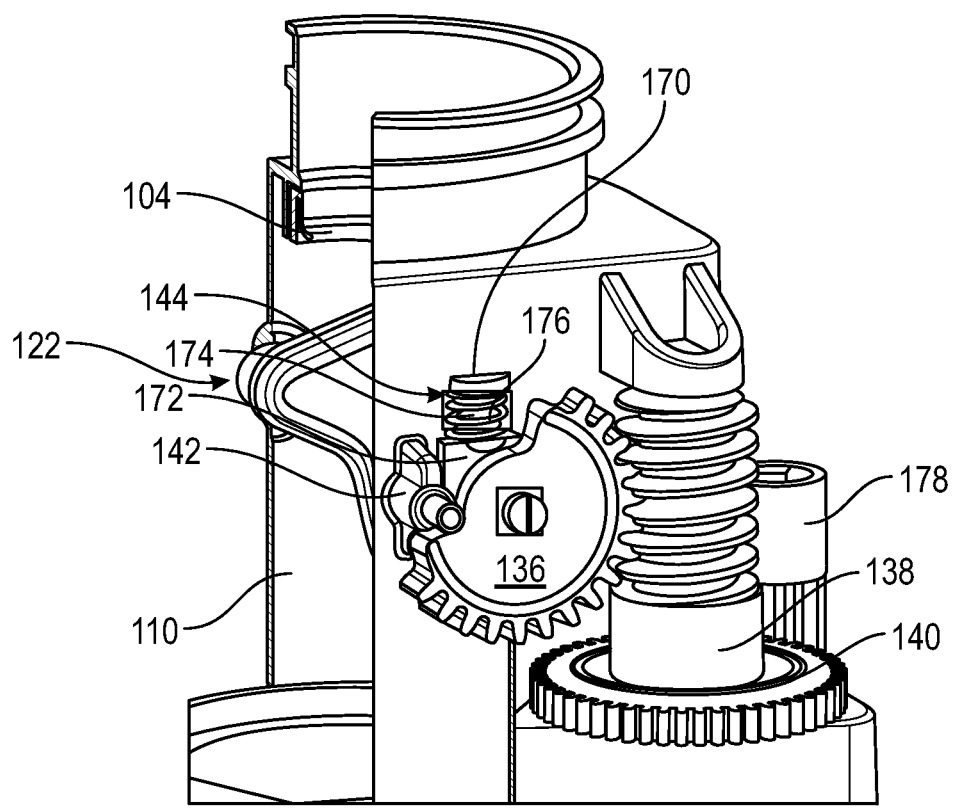
FIG. 1F is a diagram illustrating a cross-sectional side view of the frictionless rotary valve with the valve disc in the open position.

FIG. 1F is a diagram illustrating a cross-sectional side view of the frictionless rotary valve 100 with the valve disc 122 in the open position. The linear guide 144 may be a cylindrical shaped column attached within a side hole 170 provided in the side wall of the central chamber 110 of the valve body 102. The linear guide 144 may comprise a base 172 and a guide shaft 174. The base 172 may be a hollow cylinder enclosing the guide shaft 174, which may be attached between a top end and a bottom end of the side hole 170. The base 172 of the linear guide 144 may comprise a slot (not shown) that may be capable of accepting the shaft 134 of the valve disc 122 for attaching the valve disc 122 with the worm wheel 136. Further, the slot may enable the movement of the worm wheel 136 in the vertically upward direction when the worm wheel 136, engaged with the worm wheel stop 142, is lifted in a vertically upward direction by the rotation of the worm 138. Furthermore, the slot may enable the movement of the worm wheel 136 in the vertically downward direction when the worm wheel 136 is pushed in a downward direction by the rotation of the worm 138.

The linear guide 144 may further comprise a distance spring 176 that may enclose the guide shaft 174 and may enable the base 172 to move the worm wheel 136 in the vertically upward direction or in the vertically downward direction. Further, the distance spring 176 may be capable of enabling the worm wheel 136 to be engaged with the worm 138, in an embodiment of the present mechanism. The movement of the worm wheel 136 in the vertically upward direction may compress the distance spring 176 and may drive the valve disc 122 in the vertically upward direction thus pressing the valve disc 122 into the seal 104 and completely closing the frictionless rotary valve 100.

Further, the frictionless rotary valve 100 may comprise a rear support 178 attached to the central chamber 110. The rear support 178 may be a cylindrical shaped column that may be provided to impart structural strength to the frictionless rotary valve 100. The rear support 178 may be made up of a material such as, but not limited to, a synthetic plastic, a natural plastic, a natural rubber, a synthetic rubber, a metal, and so forth. The rear support 178 may be made up of any of the materials known to a person skilled in the art that may be beneficial in providing a durability to the rear support 178.

Figure 1G:
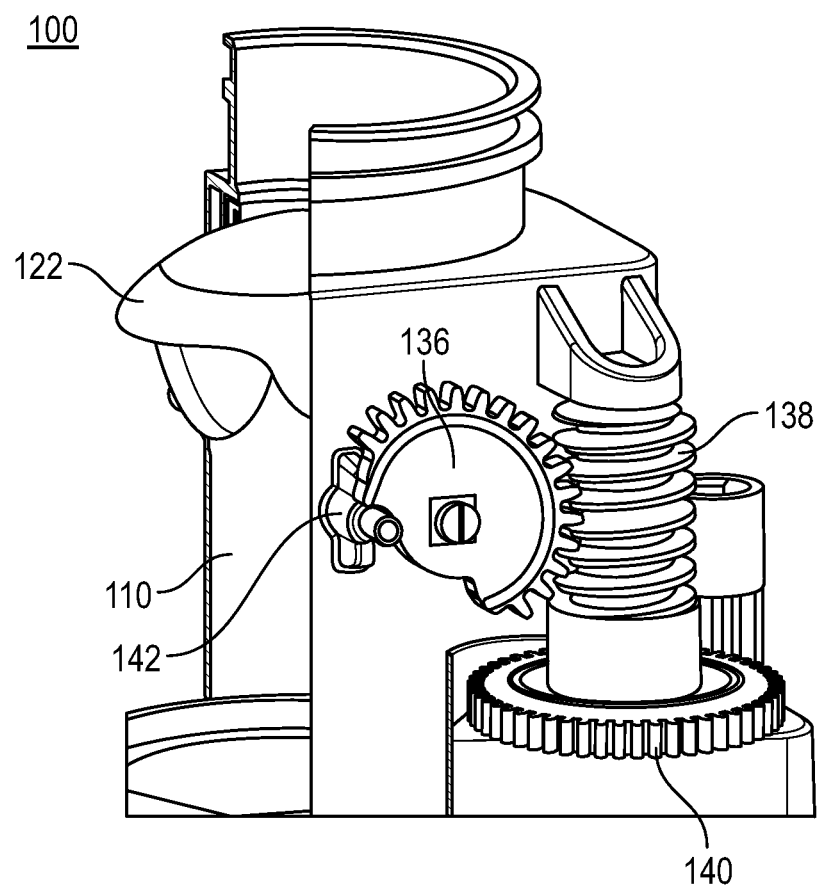
FIG. 1G is a diagram illustrating a cross-sectional side view of the frictionless rotary valve in the closed position.

FIG. 1G is a diagram illustrating a cross-sectional side view of the frictionless rotary valve 100 in the closed position. According to an embodiment of the present mechanism, the valve disc 122 attached to the central chamber 110 may be rotated from the open position (as shown in the FIG. 1F) to the closed position by rotating the drive gear 140 in the clockwise direction. The rotation of the drive gear 140 in the clockwise direction may rotate the worm 138 in a clockwise direction, thus rotating the worm wheel 136 engaged with the worm 138 in an anti-clockwise direction. Further, the rotation of the worm wheel 136 in the anti-clockwise direction may rotate the valve disc 122 in an anti-clockwise direction to an angle of 90° from the open position to the closed position. Further, the rotation of the valve disc 122 in the anti-clockwise direction to the angle of 90° from the open position to the closed position may engage the S-shaped head of the worm wheel 136 with the worm wheel stop 142. The worm wheel stop 142 may act as the stopper that may restrict the further movement of the worm wheel 136 in the anti-clockwise direction.

Figure 1H:
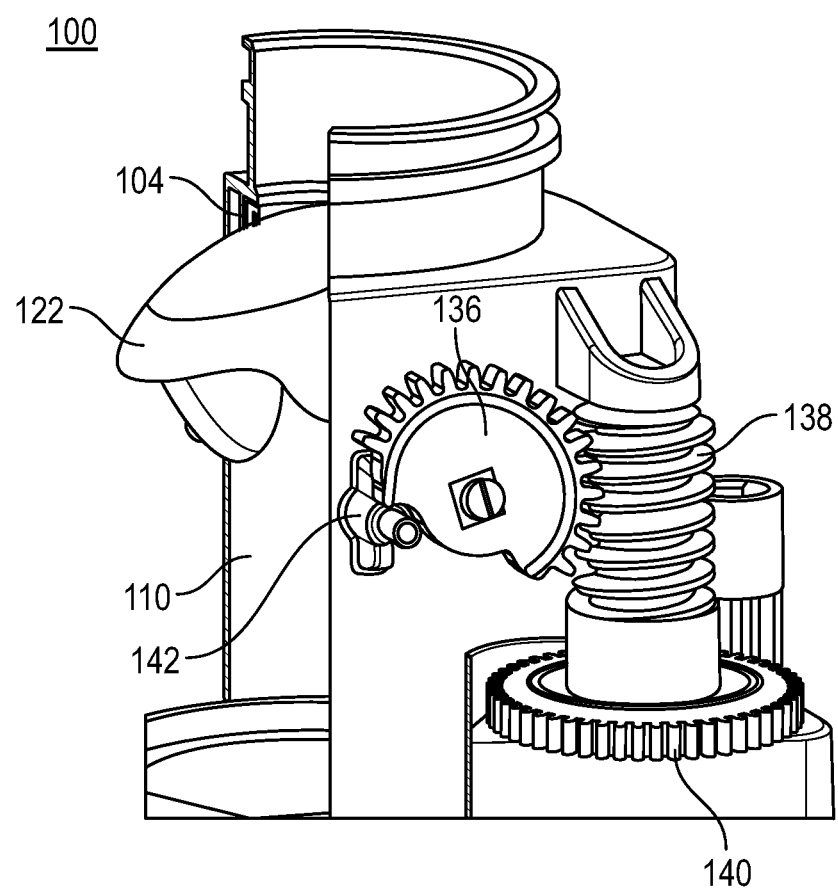
FIG. 1H is a diagram illustrating a cross-sectional side view of the frictionless rotary valve in the closed position having the valve disc pressed against a seal.

FIG. 1H is a diagram illustrating a cross-sectional side view of the frictionless rotary valve 100 in the closed position having the valve disc 122 pressed against the seal 104. According to an embodiment of the present mechanism, the rotation of the drive gear 140 in the clockwise direction may rotate the worm 138 in the clockwise direction that may enable the worm wheel stop 142 to restrict the rotation of the worm wheel 136. Further, the worm wheel 136 is driven linearly in the vertically upward direction through the slot of the linear guide 144 (as shown in the FIG. 1F). The movement of the worm wheel 136 in the vertically upward direction may drive the valve disc 122 in a vertically upward direction thus pressing the valve disc 122 into the seal 104 and restricting the rotation of the worm 138. The valve disc 122 may then completely close the frictionless rotary valve 100 and restricts a flow of the gas or the liquified gas from the central chamber 110 to the inlet of the gas pipeline or the outlet of a gas meter (not shown). Further, the restriction of the rotation of the worm 138 may result in an increased current in the motor (not shown) connected to the drive gear 140. The increased current in the motor may act as a stop indicator that may further disable the motor, thus locking the valve disc 122 in the closed position. In another embodiment of the present mechanism, the linear guide 144 may comprise a switch (not shown) that may be pressed by the movement of the worm wheel 136 in the vertically upward direction. The switch when pressed may stop the movement of the worm wheel 136, thus locking the valve disc 122 in the closed position pressed against the seal 104.

Figure 2:
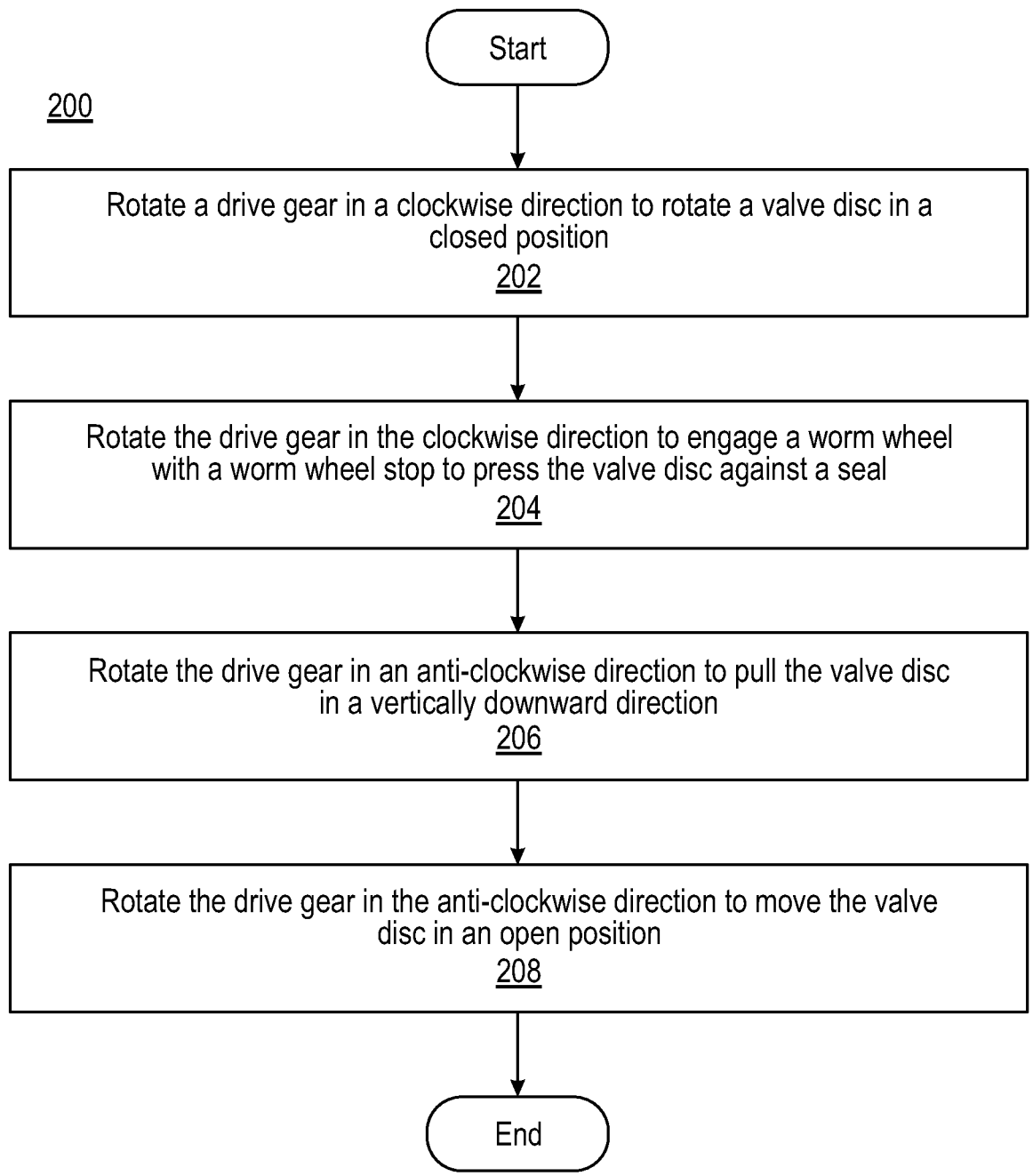
FIG. 2 illustrates a flowchart of a method for operating the frictionless rotary valve.

FIG. 2 illustrates a flowchart of a method 200 for operating the frictionless rotary valve 100.

At step 202, the user may rotate the drive gear 140 of the frictionless rotary valve 100 in the clockwise direction to close the frictionless rotary valve 100. In another embodiment of the present mechanism, the drive gear 140 of the frictionless rotary valve 100 may be rotated by a motor (not shown) in the clockwise direction to close the frictionless rotary valve 100. The rotation of the drive gear 140 in the clockwise direction may rotate the worm 138 attached to the drive gear 140 in the clockwise direction. The rotation of the worm 138 in the clockwise direction may further rotate the worm wheel 136 engaged with the worm 138 in the anti-clockwise direction thus rotating the valve disc 122 attached to the worm wheel 136 in the anticlockwise direction from the open position to the closed position.

At step 204, the rotation of the drive gear 140 in the clockwise direction may further engage the worm wheel 136 with the worm wheel stop 142. The worm wheel stop 142 may act as a stopper and drive the worm wheel 136 in the vertically upward direction. The movement of the worm wheel 136 in the vertically upward direction may compress the distance spring 176 of the linear guide 144 and may press the valve disc 122 into the seal 104, thus completely closing the frictionless rotary valve 100.

At step 206, the user may rotate the drive gear 140 in the anti-clockwise direction that may rotate the worm wheel 136 in the clockwise direction. In another embodiment of the present mechanism, the drive gear 140 of the frictionless rotary valve 100 may be rotated by a motor (not shown) in the anti-clockwise direction to close the frictionless rotary valve 100. The rotation of the worm wheel 136 in the clockwise direction may expand the distance spring 176 that may drive the valve disc 122 in the vertically downward direction.

At step 208, the rotation of the drive gear 140 in the anti-clockwise direction may rotate the valve disc 122 attached to the worm wheel 136 in the clockwise direction from the closed position to the open position.

Any publication or patent document that may be noted herein is hereby incorporated by reference to the same extent as if each individual publication, or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A frictionless rotary valve comprising:
    a valve body, to be connected within a gas meter, wherein the valve body comprising:
        an inlet connected to an outlet through a central chamber; and
        a seal, fixedly attached near the outlet, along an inner circumference of the valve body;
    a valve disc, having a ball bearing at a first end, wherein the ball bearing is attached to the valve body such that the valve disc is freely rotatable within the valve body; and
    a gear mechanism, to control a movement of the valve disc, wherein the gear mechanism comprising:
        a worm wheel engaged with a worm, wherein the worm wheel is attached to a second end of the valve disc;
        a drive gear connected to the worm, wherein a rotation of the drive gear in a clockwise direction rotates the worm wheel in an anti-clockwise direction such that the valve disc attached to the worm wheel moves in a closed position;
        a worm wheel stop, for restricting a movement of the worm wheel in the anti-clockwise direction by driving the worm wheel in a vertically upward direction; and
        a linear guide attached to the worm wheel, wherein a distance spring encloses a guide shaft of the linear guide such that a movement of the worm wheel in the vertically upward direction compresses the distance spring,
    wherein during an opening of the valve, the valve disc is moved in a direction of the linear guide and rotated afterward, and wherein in a closing of the valve, the valve disc is rotated and afterward moved in a linear direction to the closed position.

2. The valve of claim 1, wherein the drive gear is rotated in an anti-clockwise direction such that the distance spring expands and pulls the valve disc in a vertically downward direction.

3. The valve of claim 2, wherein the rotation of the drive gear in the anti-clockwise direction rotates the worm wheel in a clockwise direction such that the valve disc attached to the worm wheel moves in an open position.

4. The valve of claim 3, wherein the worm wheel stop restricts a movement of the worm wheel in the clockwise direction.

5. The valve of claim 1, wherein the valve disc is not in contact with the seal during rotation or when it is in an open position.

6. The valve of claim 1, wherein the worm wheel drives the valve disc at a specific angle toward the closed position.

7. The valve of claim 1, wherein the distance spring pushes the valve disc to begin an opening procedure.

8. The valve of claim 1, wherein during a rotation of the valve disc, the valve disc is not in contact with the seal for both an opening and closing procedure.

9. The valve of claim 1, wherein the valve disc is pressed onto the seal to complete a closing procedure.

10. A frictionless rotary valve comprising:
    a valve body, to be connected within a gas pipeline, wherein the valve body comprising:
        an inlet connected to an outlet through a central chamber; and
        a seal, fixedly attached near the outlet, along an inner circumference of the valve body;
    a valve disc, having a ball bearing at a first end, wherein the ball bearing is attached to the valve body such that the valve disc is freely rotatable within the valve body; and
    a gear mechanism, to control a movement of the valve disc, wherein the gear mechanism comprising:
        a worm wheel engaged with a worm at an angle of 90°, wherein the worm wheel is attached to a second end of the valve disc;
        a drive gear connected to the worm, wherein a rotation of the drive gear in a clockwise direction rotates the worm wheel in an anti-clockwise direction such that the valve disc attached to the worm wheel moves in a closed position;

a worm wheel stop, for restricting a movement of the worm wheel in the anti-clockwise direction by driving the worm wheel in a vertically upward direction; and a linear guide attached to the worm wheel, wherein a distance spring encloses a guide shaft of the linear guide such that a movement of the worm wheel in the vertically upward direction compresses the distance spring, wherein in an opening procedure, the valve disc is moved in a direction of the linear guide and then rotated, and wherein in a closing procedure, the valve disc is rotated and then moved linearly toward the closed position.

11. The valve of claim 10, wherein the drive gear is rotated in an anti-clockwise direction such that the distance spring expands and drives the valve disc in a vertically downward direction.

12. The valve of claim 11, wherein the rotation of the drive gear in the anti-clockwise direction rotates the worm wheel in a clockwise direction such that the valve disc attached to the worm wheel moves in an open position.

13. The valve of claim 12, wherein the worm wheel stop restricts a movement of the worm wheel in the clockwise direction.

14. The valve of claim 10, wherein the worm wheel drives the valve disc at a ninety degree angle to begin the closing procedure without being in contact with the seal.

15. The valve of claim 10, wherein the worm wheel stop completes the closing procedure.

16. The valve of claim 10, wherein the distance spring begins the opening procedure by pushing the valve disc out of the seal.

17. The valve of claim 10, wherein the distance spring completes the opening procedure by pushing the valve disc until the valve disc is not in contact with the seal.

18. A method for operating a frictionless rotary valve, the method comprising steps of:

rotating a drive gear, attached to a worm, in a clockwise direction such that a worm wheel engaged with the worm rotates in an anti-clockwise direction, wherein the rotation of the worm wheel in the anti-clockwise direction moves a valve disc attached to the worm wheel in a closed position, wherein for closing, the valve disc will rotate and move upward to the closed position, and wherein for opening, the valve disc will move toward an open position and rotate, a step of rotating the drive gear in an anti-clockwise direction such that a distance spring expands and drives the valve disc in a vertically downward direction.

19. The method of claim 18, further comprising a step of rotating the drive gear in the anticlockwise direction, which further rotates the worm wheel in a clockwise direction such that the valve disc attached to the worm wheel moves in an open position.

* * * * *